June 1, 1937. G. FRENKEL 2,082,486
PROCESS AND APPARATUS FOR THE MANUFACTURE OF FILMS AND FOILS
Filed Sept. 24, 1935 3 Sheets-Sheet 1

INVENTOR
Gennady Frenkel,
By Stone, Boyden & Mack
Attorneys.

June 1, 1937.  G. FRENKEL  2,082,486
PROCESS AND APPARATUS FOR THE MANUFACTURE OF FILMS AND FOILS
Filed Sept. 24, 1935   3 Sheets-Sheet 2

INVENTOR
Gennady Frenkel,
By Stone, Boyden & Mack
Attorneys.

June 1, 1937. G. FRENKEL 2,082,486
PROCESS AND APPARATUS FOR THE MANUFACTURE OF FILMS AND FOILS
Filed Sept. 24, 1935 3 Sheets-Sheet 3

INVENTOR
Gennady Frenkel
By
Stone, Boyden & Mack
Attorneys.

Patented June 1, 1937

2,082,486

UNITED STATES PATENT OFFICE 2,082,486

PROCESS AND APPARATUS FOR THE MANUFACTURE OF FILMS AND FOILS

Gennady Frenkel, Surbiton, England

Application September 24, 1935, Serial No. 41,922
In Great Britain September 25, 1934

5 Claims. (Cl. 18—15)

This invention relates to the manufacture of films and foils from cellulosic derivatives, gelatine, synthetic resins and other plastic substances from which films and foils can be manufactured by an evaporative method. The films and foils with which the invention is concerned are such as are used for wrapping and packing purposes, and are hereinafter referred to as "films and foils of the kind referred to."

At the present time, films and foils of the kind referred to are manufactured from cellulose esters, such as cellulose acetate and cellulose ethers, which are dissolved in a suitable solvent, for example, a mixture of acetone and ethyl acetate, and the solution is poured on to a rotating drum or moving endless band, the moving surface on which the solution is poured being passed through a drying chamber in which the solvent is evaporated, leaving a deposit of the cellulose derivative as a flexible film or foil (depending upon the thickness of the solution poured on to the band) on the drum or band. The drum is made so large or the endless band is made so long that the foil is dry and can be stripped off before the moving drum or band returns to the point of delivery of the solution. The point where the foil is stripped is usually comparatively close to the delivery point of the solution, so as to utilize as much as possible of the moving surface. The film or foil is first stripped from the drum or endless band by hand and is led to a spool on which it is wound by the power means driving the drum or band. The stripping is a delicate operation because the foil is apt to tear, particularly if the surface of the drum or band on which it is formed is at all irregular, for instance, due to the presence of particles of dust. Since the whole process of manufacture takes place on one machine necessarily moving with a uniform speed, the speed of the process must be limited to that of the slowest operation; hence the speed at which the solution is poured and the foil formed is limited to the speed of stripping.

With these machines, in the not uncommon event of the foil tearing during the stripping operation, it is necessary to stop the pouring operation as well as the stripping, until the faulty part of the foil is removed and the stripping is proceeding in an orderly fashion once more. Since both the pouring and stripping operations take place on the same machine, it is necessary when pouring to have regard to what is happening at the stripping end, and vice versa, if considerable wastage of solution and manufactured foil is to be avoided. Even so, the fact that both operations are performed on the same machine handicaps the operator and results in much wastage of material and time in stoppages, thus adding to the already high cost of production due to the low speed at which the machine must be worked.

After being in use for some time, the prepared smooth surface of the drum or band deteriorates and needs to be re-treated. Also, when a tear occurs, the surface of the drum or band requires to be smoothened locally at the point where the tear commences. A further disadvantage of the drum or endless band machines consists in that the entire machine is thrown out of action while the drum or band is being re-surfaced either entirely or only locally.

An object of my invention is to improve the process of manufacture of films and foils of the kind referred to, in order to increase the rate of output thereof and cheapen the cost of manufacture. Another object is to provide a new unit system of apparatus for the process. Another object is to arrange the manufacture of films and foils in a number of separate units and to provide a solvent recovery plant for each unit, so as to obtain economic working of the process and recovery of the solvents. Another object is to reduce wastage of solution and foil in the process. A further object is to provide a continuous manufacturing process wherein stoppages due to tears and faults in the foil are avoided or reduced to a minimum. A feature of my invention for this purpose consists in forming the band, which passes continuously through the drying enclosure, in a plurality of separate sections which may be connected and disconnected as required. Other objects and features of the invention will be pointed out more particularly hereinafter.

The invention consists essentially in a process for the manufacture of films and foils of the kind referred to from cellulose derivatives, resins and other plastic substances, or mixtures thereof, with or without plastifiers, in which a solution of the plastic substance in a volatile solvent is poured onto a moving smooth support and thereafter the support is passed through a drying chamber in order to evaporate the solvent and thereby form and dry thereon a film or foil which is subsequently stripped from the support, characterized in that the operation of pouring the solution on to the support is separated from the slower operation of stripping the film or foil formed from the support and these two operations are performed at speeds independent of and correlated to each other.

The invention also consists in apparatus for performing the process set forth in the preceding paragraph.

The invention is illustrated in one embodiment in the accompanying drawings, in which Fig. 1 diagrammatically illustrates in elevation a pouring and solvent recovery unit;

Figure 1:
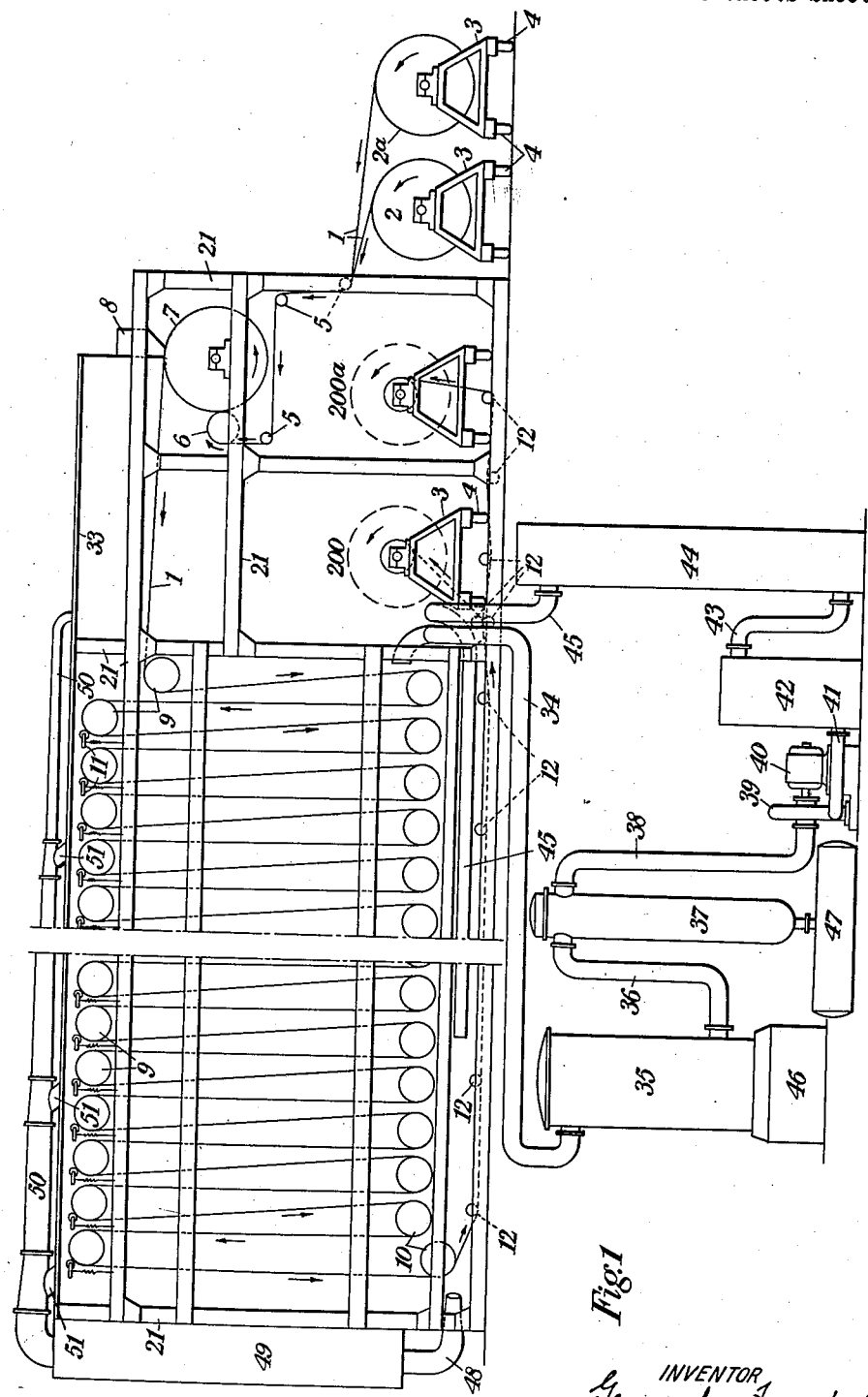

Referring to Fig. 1, a support or band 1 is wound on a spool 2 mounted on the carriage 3 provided with wheels 4 so that it can be moved from place to place. The band 1 passes over guide rollers 5 around the driving roller 6 and thence round the roller 7 above which is mounted a trough or tank 8 which contains the pouring solution. The band 1 then passes in a series of vertical loops around the upper and lower sets of rollers 9 and 10 respectively, as shown, the upper set 9 having weighted or spring-pressed presser rollers 11 which press the edge of the band 1 against the rollers 9. The width of the discharge opening through which the solution is delivered to the band 1 is such that the edges of the band are kept free from the solution. After leaving the last roller 10 the band 1 returns over the further guide rollers 12 to a take-up spool 200 mounted on a carriage 3 provided with wheels 4. The framework 21 supports the various guiding and driving rollers etc.

Figure 2:
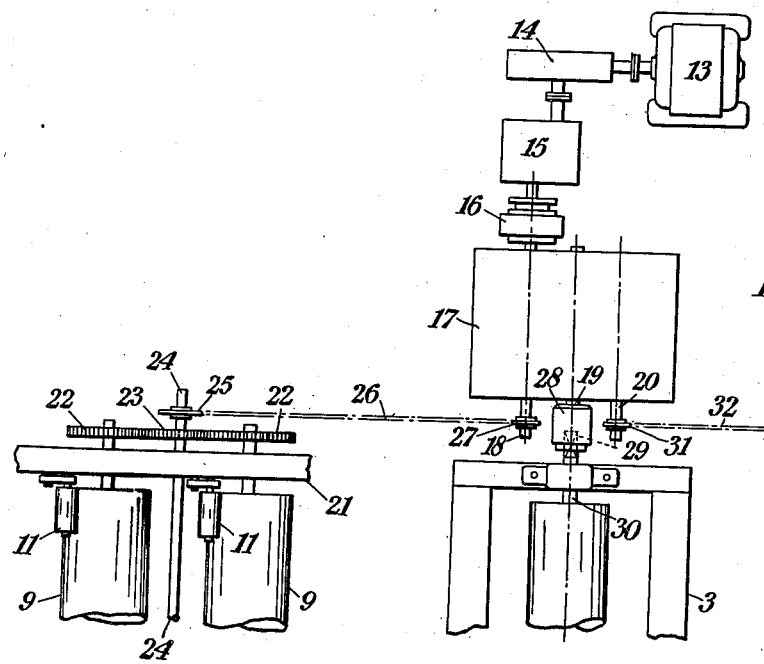
Fig. 2 is a plan view of parts of Fig. 1 showing distribution of the power drive.

The roller 6 and the set of rollers 9 are driven from a suitable power source, one arrangement for this purpose being illustrated in Fig. 2. In this figure, the drive from an electric motor 13 is transmitted through reduction gearing 14 to a gearbox 15 from whence the drive is transmitted through a clutch 16 to the distributing gears 17 which connect with the shafts 18, 19 and 20. The spindle of each roller 9 has keyed to it a spur wheel 22 and between adjacent rollers 9 is positioned a spur wheel 23 keyed to a shaft 24 and meshing with the adjacent spurs 22. To the shaft 24 is also keyed the sprocket 25 which is coupled to the shaft 18 by a chain 26 which passes over a sprocket 27 on shaft 18. The shaft 19 is fitted with a socket 28 into which can be fitted the end 29 of the spindle 30 of the spool 200. The socket 28 and spindle end 29 are shaped in such a way as to enable the drive to be transmitted from the shaft 19 to the spool 200. In this way, a quick-release driving connection is provided to the take-up spool 200. The shaft 20 is fitted with a sprocket 31 over which passes a chain 32 for driving the roller 6 by connection with a sprocket keyed to the spindle of the latter. The roller 6 drives the roller 7 by frictional engagement with the periphery thereof. The object of this frictional drive is to ensure a smooth rotational movement of the roller 7, at a point on the periphery of which the solution in the tank 8 is delivered to the band 1.

The gear box 15 provides a set of speeds at which the machine can be run, according to the nature of the solution which is being poured and the kind of film or foil which is being produced at the time. Preferably, the gearbox is arranged to provide, in addition to the aforementioned set of operating speeds, a very low speed at which a change-over from one spool to another can be effected without stopping the machine, thus rendering the operation continuous.

Referring again to Fig. 1, when the length of band 1 on the spool 2 is nearly exhausted, the operator throws the machine into low gear and connects the end of the band, by clips or other suitable means, with the beginning of another length of band 1 on a further spool 2a. In a similar manner, when the end of a section of band is near the take-up spool 200, it is disconnected from the succeeding section of band which is then led to another take-up spool 200a.

The pouring machine is enclosed by the enclosure 33 which is heated so as to facilitate the evaporation of the solvent and drying of the foil during passage of the band through the enclosure. The temperature of the enclosure, the length of the band, and the speed at which it moves are all so regulated and correlated that when the band emerges from the enclosure and is ready to be rolled up on the take-up roller, the film or foil on it is dried. The enclosure 33 serves the dual purpose of expediting the evaporation of the solvent and also enabling the latter to be recovered. The bottom of the enclosure, beneath the rollers 10, containing the rollers 12, is partitioned from the remainder of the enclosure to form a separate chamber through which the band and dried foil pass before being wound up on the take-up spool.

For recovering the solvent, a pipe 34 communicates with the upper chamber of the enclosure 33 and is connected to a condenser 35 from which a pipe 36 leads to a refrigerator 37. A pipe 38 leads from the latter to a centrifugal fan 39 driven by a motor 40. From the fan 39 a pipe 41 leads to an air filter 42 from which a pipe 43 leads to a heater 44. From the latter a pipe 45 passes into the bottom chamber of the enclosure 33. Hot air charged with the vapour of the solvent is aspirated through the apparatus above-described by the fan 39 and in the condenser 35 some of the solvent is condensed and collects in the receiver 46. Further, and more intensive condensation of the solvent takes place in the refrigerator 37 and the condensed solvent is collected in the receiver 47. The air leaving the refrigerator 37 still contains, in practice, a small percentage of solvent and consequently, after passing through the filter 42 to remove dust etc., the air is heated in the heater 44 to bring it to about the outside temperature, after which it is led into the lower chamber of the enclosure where it meets the band 1 before the latter emerges from the enclosure to be wound up on the take-up spool 200.

In order to facilitate the evaporation of the solvent as the band 1 carrying the solution passes through the enclosure 33, and thus expedite the process, air is drawn from the lower chamber of the enclosure through the inlet pipe 48 into the heater 49 where it is heated to a temperature of, for example about 50° C. and is afterwards led into the upper part of the enclosure through the pipe 50 provided with a number of branch discharge pipes 51 at intervals along its length. Preferably, the upper part of the enclosure, where the heating takes place to dry the film or foil, is divided by vertical partitions into a number of compartments into which the branch pipes 51 discharge respectively. By the provision of an enclosure and heater in the manner described, the temperature of the enclosure and the airflow in the various chambers in it may be controlled according to the nature of the solution which is being poured (its viscosity, etc.) and the thickness etc. of the film or foil being manufactured, whereby a strong and clear film or foil can be produced in the shortest time.

Figure 3:
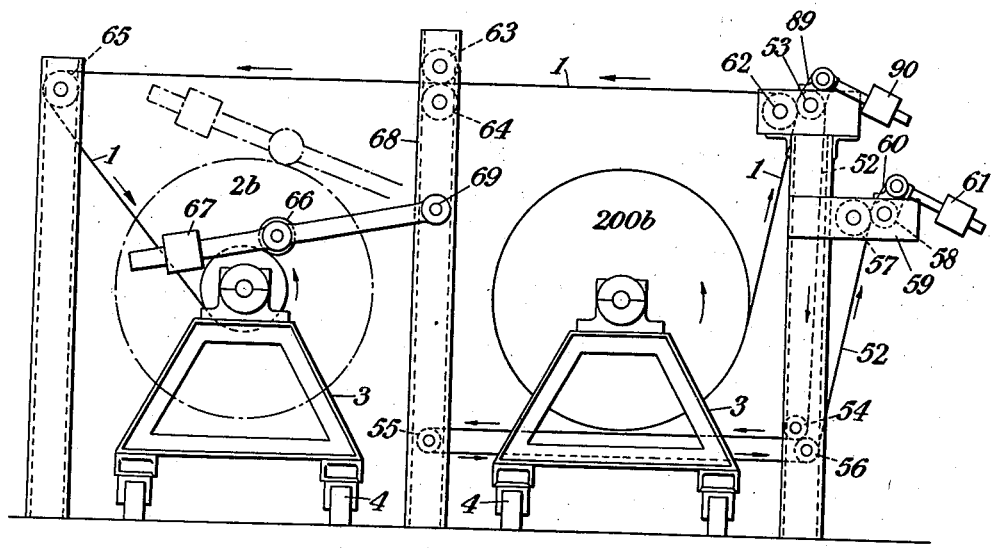
Fig. 3 illustrates a stripping unit in elevation.

When a section of band 1 supporting a foil has been wound on to the take-up roller 200, the latter is disconnected from the driving shaft 19 and is moved to the stripping unit illustrated in Fig. 3 to take up the position indicated by the spool 200b in this figure. The foil 52 is peeled from the end of the band 1 and is passed over the roller 53 down round the roller 54 along to roller 55, back to roller 56 and thence up between the driving roller 57 and roller 58, finally being wound on the roller 58. The latter is pivotally mounted on the framework member 59 by means of the link 60 so as to be movable away from the roller 57 as the thickness of the turns of foil increases. The roller 58 and foil are pressed against the roller 57 by means of the weighted arm 61 so as to be driven by frictional contact with the roller 57. When it parts from the band 1 at the roller 53, the foil may not be perfectly dry on the surface which has been in contact with the band and therefore in order to make sure that the foil is perfectly dry before being wound on the roller 58, it is not taken direct to the latter roller, but is passed over the intermediate rollers 54, 55 and 56, during which it is exposed to the atmosphere.

Meanwhile, the band 1 is drawn over the roller 62, between the rollers 63 and 64, and thence over the roller 65 to the spool 2b on which it is wound ready for transference again to the pouring and drying unit of Fig. 1. The rollers 62, 63, 64 and 65 are driven at the same speed from a power source and in order to wind the band 1 on the spool 2b, the roller 66, carried on the weighted arm 67 pivotally mounted on the framework member 68 at 69, is driven from the same power source and at the same speed, to wind up the band 1 by driving its periphery frictionally. As the number of turns of the band 1 on the spool 2b increases, the driving roller 66 is moved upwards, always, however, remaining in frictional contact with the periphery of the band. In this way, the band is wound at a uniform speed. The final position, where the band 1 is fully wound on the spool 2b, is indicated by the chain-dotted lines.

Figure 4:
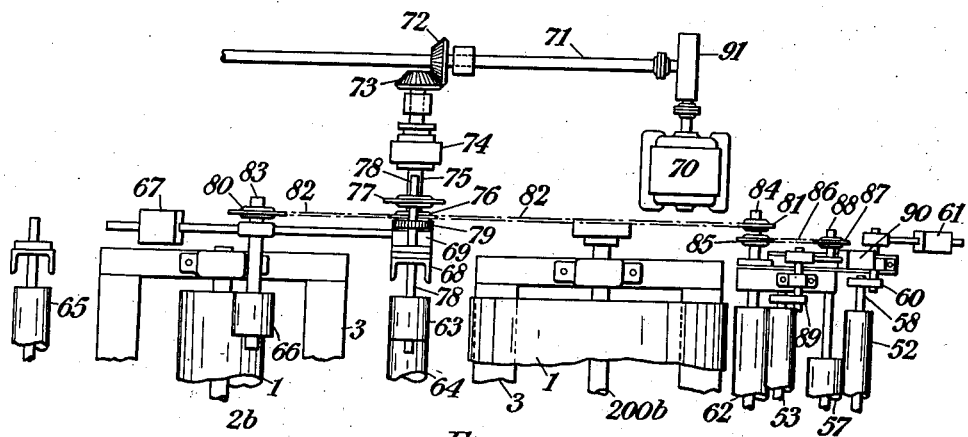
Fig. 4 is a plan view of parts of Fig. 3 showing the distribution of the power drive.

The drive for the stripping unit of Fig. 3 is illustrated in Fig. 4. In this figure, an electric motor 70 drives, through reduction gearing 91, a main-shaft 71 which is provided with bevelled gears 72 along its length for transmitting the drive to a series of the stripping units illustrated in Fig. 3. Fig. 4 shows the driving arrangement to one unit and it will be understood that a similar arrangement will be provided for each unit provided. The bevel gear wheel 72 meshes with a bevel gear wheel 73 which transmits the drive through a clutch 74 to the shaft 75 on which are keyed two sprockets 76, one of which (not shown) is below the sprocket 77 and transmits the drive thereto by means of a chain. The sprocket 77 is keyed to the shaft 78 of the roller 63. The rollers 63 and 64 are geared together by means of gear wheels 79 so as to rotate at the same speed. The other sprocket 76 (shown in the drawings) transmits the drive to the two sprockets 80, 81 through a chain 82. Sprocket 80 is keyed to the spindle 83 of the roller 66. The sprocket 81 is keyed to the spindle 84 of the roller 62 and to the spindle 84 is also keyed a further sprocket 85 which, through a chain 86 and sprocket 87 on the spindle 88 of roller 57, drives the latter. The roller 53 is pivotally mounted to a part of the framework on a link 89 and is pressed against the driving roller 62 by the weighted arm 90, in a manner similar to that for the roller 58.

It will be understood that the spools 2, 2a, 2b, 200, 200a, 200b are of all similar construction, as is indicated in the drawings, and are interchangeable one with another, but in this specification they are given different reference numerals merely for the sake of clearness in the description.

Since the stripping operation is conducted separately from the pouring and drying operations, it is clear that the speed at which the foil can be produced in the unit of Fig. 1 is quite independent of the speed at which the manufactured foil can be stripped from its band in the unit of Fig. 3 and consequently each unit can be worked at a speed which is best suited to the operation being performed. The stripping operation is a slow one, being considerably slower than the speed of which the films or foils can be produced in the unit in Fig. 1. Consequently, in order to render the process of manufacture continuous, a number of the units of Fig. 3 are provided for each unit of Fig. 1, the drive to each of such stripping units being taken from the main-shaft 71, the units being connected thereto and disconnected therefrom as required by means of the clutch 74.

Although one form of mechanism has been illustrated in Fig. 1 for advancing the band carrying the solution through the drying enclosure 33, any other suitable arrangement for the purpose may be employed, since it is immaterial for the purposes of the present invention precisely how the band is taken through the drying enclosure so long as the means adopted enable a considerable length of band to be taken at a time through an enclosure of reasonably small dimensions. An alternative arrangement for this purpose is diagrammatically represented in Fig. 5, wherein the band 1 carrying the foil solution is passed over guide rollers 92 around within the encloslure 33, in the manner of a spiral. In the drawings, the enclosure and band are represented in elevation. In view of the fact that both the band 1 and the foil formed on it are flexible, the band can, before the solution is poured on it and after the foil has formed, be twisted so as to change its travelling direction. This property may be made use of to economize space of the plant by arranging the stripping part of the apparatus adjacent the pouring and drying part and employing stationary spools instead of those mounted on movable carriages 3 as described with reference to Figs. 1–4. The method of working in this case can be seen from the diagrammatic representation in Fig. 5. For clearness in understanding the layout, spools corresponding to those illustrated in Figs. 1 and 3 are given the same reference numerals. The procedure is similar to that adopted with the apparatus above-described, but in this case the spools remain stationary. The obliquely positioned rollers 93 indicate the twisting of the band before it enters and after it leaves the enclosure 33. The take-up spools 200, 200a and 200b are operated at the speed of the pouring operation while the band 1 carrying the foil is wound on them as it leaves the enclosure 33 and are operated at the speed of the stripping operation when the section of band on the spool is disconnected from the succeeding section of band leaving the enclosure, and is re-wound on to the respective spool of the series 2, 2a, 2b.

Figure 5:
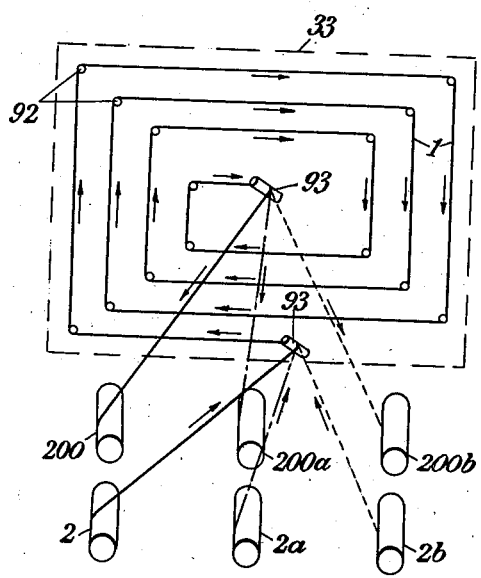
Fig. 5 diagrammatically illustrates alternative arrangements of the pouring and stripping units.

This arrangement of stationary spools may obviously be employed in conjunction with apparatus for advancing the band through the drying enclosure other than that represented in Fig. 5; for example, the arrangement may be employed in conjunction with the apparatus illustrated in Fig. 1. Obviously, also, the system of movable spools described with reference to Figs. 1 and 3 may be employed in conjunction with the advancing means represented in Fig. 5. Moreover, instead of the advancing means illustrated in Figs. 1 and 5, other suitable means may be employed without departing from the invention. For instance, the band may be advanced through the drying enclosure by means of endless chains provided with clips which clip the edges of the band which may be specially reinforced for this purpose; or again, the band may be advanced by means of an arrangement in which endless chains or the like carry a plurality of rods which pick up the band in succession and thereby form the band into a series of loops which are then carried bodily through the drying enclosure.

The band may be made of any suitable material. Materials which have been usually employed hitherto are flexible metal bands of copper or aluminium or an aluminium alloy. However, instead of metal bands, I may use bands of other, cheaper, flexible material, such as paper or canvas which is coated with a suitable material, such as a lacquer, so as to provide it with a suitable surface for receiving the pouring solution. Similarly, a celluloid band or a celluloid band reinforced with cloth or the like may be used. If a non-inflammable band is preferred, it may be composed of non-inflammable celluloid. Instead of flexible materials which need to be prepared to give them a surface suitable for receiving the pouring solution, I may also use flexible materials which are already themselves sufficiently smooth for the purpose.

One great advantage of my new process and apparatus consists in that to each pouring unit there may be attached a solvent recovery plant. Hitherto, with the drum or endless band machines hereinbefore mentioned, it has been practicable to provide a recovery plant only with several such machines. Such central plant was economical only if all the machines were working and furthermore, it was necessary to work all the machines with pouring solutions having the same solvents. The independent unit system which I now propose enables each pouring unit to be worked independently of the others and therefore enables several different kinds of foil to be produced at the same time. Furthermore, the unit system needs very little space compared with these prior machines.

I claim:

1. A continuous method of manufacturing films and foils of the kind herein referred to from cellulose derivatives, resins and other plastic substances, which comprises continuously feeding a plurality of separate stored lengths of a support successively to a film or foil-forming machine, past a delivery point therein, delivering a solution of plastic substance in a volatile solvent to said moving support at said point, thereafter, as said support is advanced evaporating said solvent from said solution to leave a film or foil of said plastic substance deposited on said support, and drying said film or foil, thereafter storing said separate lengths of said support successively, transferring said stored lengths of support to a stripping machine separate from said first-mentioned machine and there stripping said film or foil from said lengths of support and transferring said stripped lengths of support back to said first-mentioned machine preparatory to again feeding said lengths of support successively therethrough, the speed of the delivering, evaporating and drying operations being different from but correlated to the speed of said stripping operation.

2. Apparatus for manufacturing films and foils of the kind referred to from cellulose derivatives, resins and other plastic substances, comprising in combination, means for storing a length of band material, a device for delivering a solution of a plastic substance in a volatile solvent to said band to form a film, means for drawing said band past said delivery device, means for supplying said solution to said device, a drying member, means for advancing said band through said chamber, a second storing means for re-storing said band after passage through said chamber, a third storing means, means for transferring said band from said second storing means to said third storing means, and further storing means for film or foil stripped from said band during said transference last-mentioned.

3. Apparatus for the manufactlure of films and foils of the kind herein referred to from cellulose derivatives, resins and other plastic substances, comprising a pouring and drying machine, a stripping machine separate from said first-mentioned machine, a storing device upon which a support carrying dried foil or film is stored, prior to being transferred to said stripping machine, and further storing devices and supports for enabling the manufacture to be performed continuously, so that said supports are first employed, successively, in said pouring and drying machine and are subsequently transferred to said stripping machine.

4. Apparatus as defined in claim 3, characterized by the provision of several separate stripping machines for working in conjunction with one pouring and drying machine.

5. Apparatus as defined in claim 2, characterized in that said support is passed in spiral manner through said drying chamber.

GENNADY FRENKEL.